US012199358B2

(12) United States Patent
Kajikiya

(10) Patent No.: US 12,199,358 B2
(45) Date of Patent: Jan. 14, 2025

(54) ANTENNA MODULE AND MAGNETIC SHEET WITH COIL PATTERN

(71) Applicant: TDK Corporation, Tokyo (JP)

(72) Inventor: Shoma Kajikiya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 17/743,070

(22) Filed: May 12, 2022

(65) Prior Publication Data

US 2022/0376396 A1 Nov. 24, 2022

(30) Foreign Application Priority Data

May 18, 2021 (JP) ................................ 2021-083624

(51) Int. Cl.
*H01Q 7/00* (2006.01)
*H01Q 9/04* (2006.01)

(52) U.S. Cl.
CPC ............. *H01Q 7/00* (2013.01); *H01Q 9/0414* (2013.01)

(58) Field of Classification Search
CPC .......... H01Q 7/00; H01Q 9/0414; H01Q 7/06; H01Q 1/38; H01Q 1/50
See application file for complete search history.

(56) References Cited

U.S. PATENT DOCUMENTS

| | | | | |
|---|---|---|---|---|
| 2008/0191332 A1 | | 8/2008 | Koyama et al. | |
| 2010/0001823 A1* | | 1/2010 | Kawarai ............. | H01F 17/0013 336/200 |
| 2012/0162028 A1* | | 6/2012 | Kubo ..................... | H01Q 1/528 343/788 |
| 2013/0175984 A1 | | 7/2013 | Yamazaki et al. | |
| 2014/0246504 A1 | | 9/2014 | Kemoto et al. | |
| 2015/0035718 A1* | | 2/2015 | Gouchi .................... | H01Q 1/48 343/788 |
| 2015/0325917 A1* | | 11/2015 | Ito ............................ | H01Q 1/24 343/866 |
| 2015/0340754 A1* | | 11/2015 | Asou .................... | H01Q 1/2225 343/788 |
| 2016/0226146 A1* | | 8/2016 | Komachi ............. | H01Q 1/2225 |
| 2017/0271746 A1* | | 9/2017 | Komachi ................. | H01Q 7/00 |
| 2020/0381802 A1 | | 12/2020 | Matsushima et al. | |
| 2021/0159587 A1* | | 5/2021 | Lee ........................ | H01Q 1/085 |
| 2022/0342461 A1* | | 10/2022 | Jeon ........................ | H02J 50/12 |

FOREIGN PATENT DOCUMENTS

| | | |
|---|---|---|
| JP | 2011-66759 A | 3/2011 |
| JP | 2020-188453 A | 11/2020 |
| JP | 2020-195049 A | 12/2020 |
| WO | 2013/114998 A1 | 8/2013 |

OTHER PUBLICATIONS

Tamura et al. JP2020188453A Machine Translation (Year: 2020).*

* cited by examiner

*Primary Examiner* — Hai V Tran
*Assistant Examiner* — Michael M Bouizza
(74) *Attorney, Agent, or Firm* — Rimon P.C.

(57) ABSTRACT

Disclosed herein is an antenna module that includes a substrate on which a first coil is provided, a base material on which a second coil and a magnetic sheet overlapping the second coil are provided, and an adhesive layer bonding the substrate and the base material such that the first coil and the magnetic sheet overlap each other.

16 Claims, 5 Drawing Sheets

ANTENNA MODULE AND MAGNETIC SHEET WITH COIL PATTERN

CROSS-REFERENCE TO RELATED APPLICATION

This application claims the benefit of Japanese Patent Application No. 2021-083624, filed on May 18, 2021, the entire disclosure of which is incorporated by reference herein.

BACKGROUND

Field

The present disclosure relates to an antenna module and a magnetic sheet with a coil pattern.

Description of Related Art

The antenna module described in JP 2011-066759A has a structure in which an antenna coil and a booster coil are formed on the front and back surfaces of a substrate, respectively.

However, when a booster coil is formed on the back surface of a substrate on the front surface of which an antenna coil is formed like the antenna module described in JP 2011-066759A, the booster coil cannot be changed in design afterward. Thus, in conventional antenna coils having a plurality of coils, it is difficult to change the design of some coils afterward.

SUMMARY

It is therefore an object of the present disclosure to provide an antenna module in which a design change of some coils can be made afterward.

An antenna module according to an embodiment of the present disclosure includes: a substrate on which a first coil is provided; a base material on which a second coil and a magnetic sheet overlapping the second coil are provided; and an adhesive layer bonding the substrate and base material such that the first coil and the magnetic sheet overlap each other. This allows the design of the second coil to be changed afterward.

BRIEF DESCRIPTION OF THE DRAWINGS

The above features and advantages of the present disclosure will be more apparent from the following description of certain preferred embodiments taken in conjunction with the accompanying drawings, in which:

FIG. 2A illustrates a pattern formed on the surface 21 of the base material 20, and FIG. 2B illustrates a pattern formed on a surface 22 of the base material 20;

DETAILED DESCRIPTION OF THE EMBODIMENTS

Preferred embodiments of the present disclosure will be explained below in detail with reference to the accompanying drawings.

Figure 1:
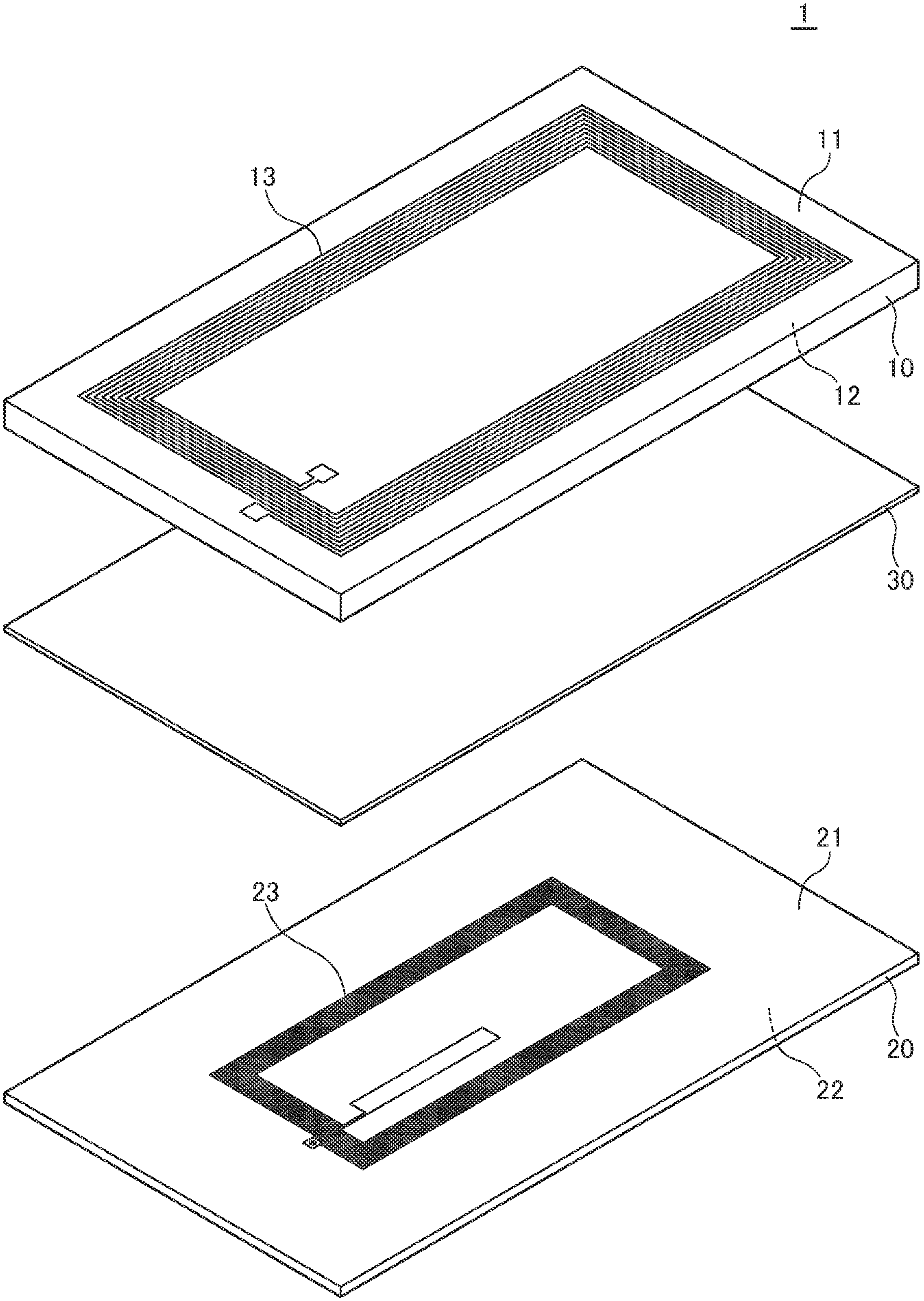
FIG. 1 is a schematic exploded perspective view illustrating the outer appearance of an antenna module 1 according to an embodiment.

FIG. 1 is a schematic exploded perspective view illustrating the outer appearance of an antenna module 1 according to an embodiment.

As illustrated in FIG. 1, the antenna module 1 according to the present embodiment includes a rigid substrate 10 made of, for example, epoxy resin, a flexible base material 20 made of, for example, PET resin, and an adhesive layer 30 that bonds the substrate 10 and base material 20. An antenna coil 13 as an example of a first coil used for NFC (Near Field Communication), is formed on one surface 11 of the substrate 10. A booster coil 23 as an example of a second coil, which is a coil pattern for extending communication distance, is formed on one surface 21 of the base material 20.

Figure 2B:
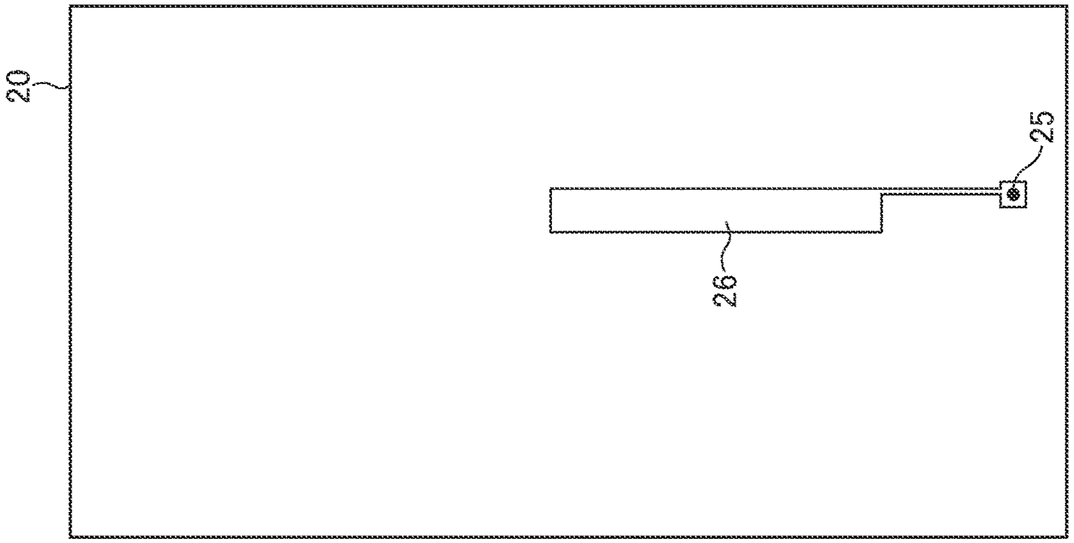
FIGS. 2A and 2B are schematic plan views illustrating a pattern shape as viewed from the surface 21 of the base material 20, where
Figure 2A:
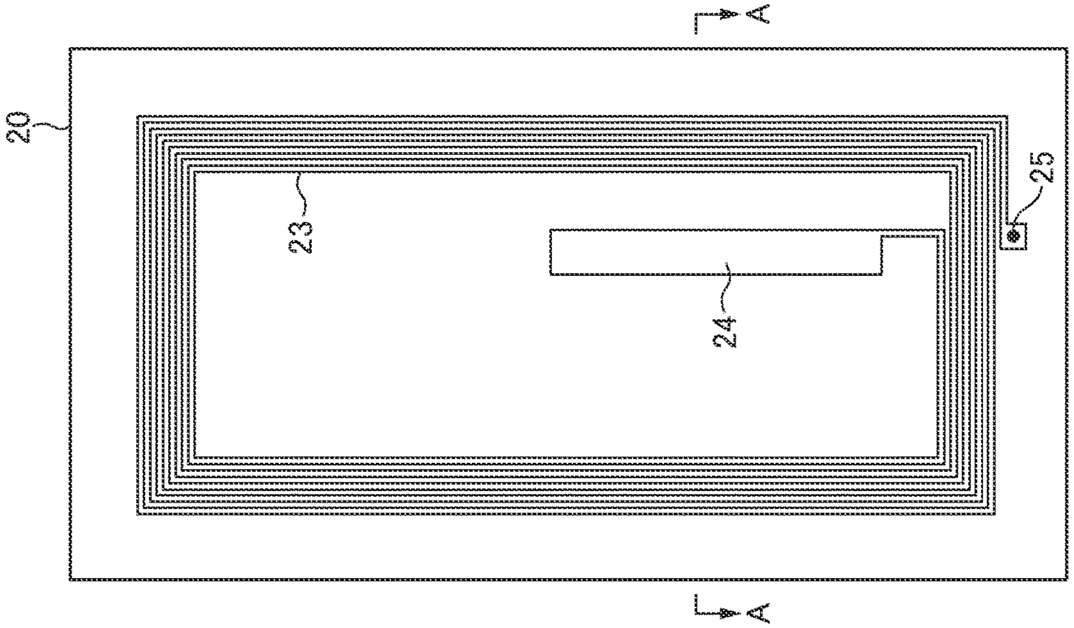
Figure 3:
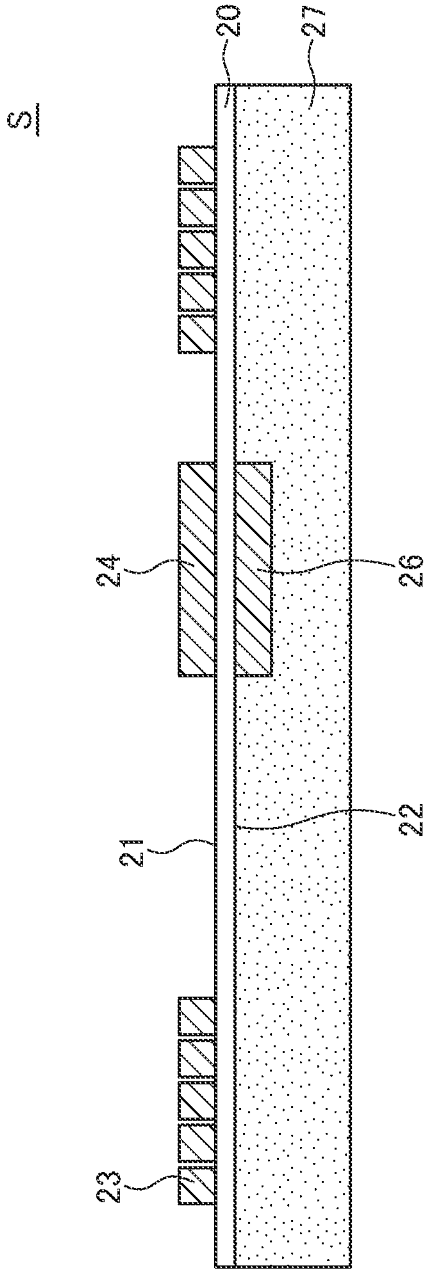
FIG. 3 is a schematic cross-sectional view taken along the line A-A in FIG. 2A.

FIGS. 2A and 2B are schematic plan views illustrating a pattern shape as viewed from the surface 21 of the base material 20. FIG. 2A illustrates a pattern formed on the surface 21 of the base material 20, and FIG. 2B illustrates a pattern formed on a surface 22 of the base material 20. FIG. 3 is a schematic cross-sectional view taken along the line A-A in FIG. 2A.

As illustrated in FIG. 2A, the booster coil 23 is wound around in a plurality of turns on the surface 21 of the base material 20. In the example illustrated in FIG. 2A, the booster coil 23 is wound in five turns and has a rectangular outer shape; however, the number of turns of the booster coil 23 and the outer shape thereof are not limited thereto. Further, in the example illustrated in FIG. 2A, although the booster coil 23 is formed on the surface 21 of the base material 20, it may be formed on the surface 22 of the base material 20, or may be formed on both the surfaces 21 and 22 of the base material 20. The inner peripheral end of the booster coil 23 is connected to a capacitor electrode pattern 24. The outer peripheral end of the booster coil 23 is connected to a capacitor electrode pattern 26 illustrated in FIG. 2B through a via conductor 25 that runs through the base material 20. As illustrated in FIG. 3, the capacitor electrode patterns 24 and 26 face each other through the base material 20 to thereby constitute a capacitor. Thus, both ends of the booster coil 23 are connected respectively to the capacitor electrode patterns 24 and 26 of the capacitor, whereby the booster coil 23 constitutes a closed circuit connected to no external circuit.

As illustrated in FIG. 3, a magnetic sheet 27 is formed on the surface 22 of the base material 20, thereby constituting a magnetic sheet S with coil pattern. The magnetic sheet 27 is made of a composite magnetic material obtained by mixing metal magnetic powder such as permalloy and resin and has flexibility. Since the base material 20 itself has flexibility, the magnetic sheet S with coil pattern has flexibility as a whole. The magnetic sheet 27 is formed entirely on the surface 22 of the base material 20 so as to overlap the booster coil 23 in a plan view and covers the upper and side surfaces of the capacitor electrode pattern 26 so as to embed therein the capacitor electrode pattern 26. An insulating film may be provided between the capacitor electrode pattern 26 and the magnetic sheet 27 so as to ensure insulation. Alternatively, in place of the magnetic sheet 27 made of a composite magnetic material, a film-like magnetic sheet 27 having flexibility may be attached to the surface 22 of the base material 20 by a double-sided tape or the like.

Figure 4:
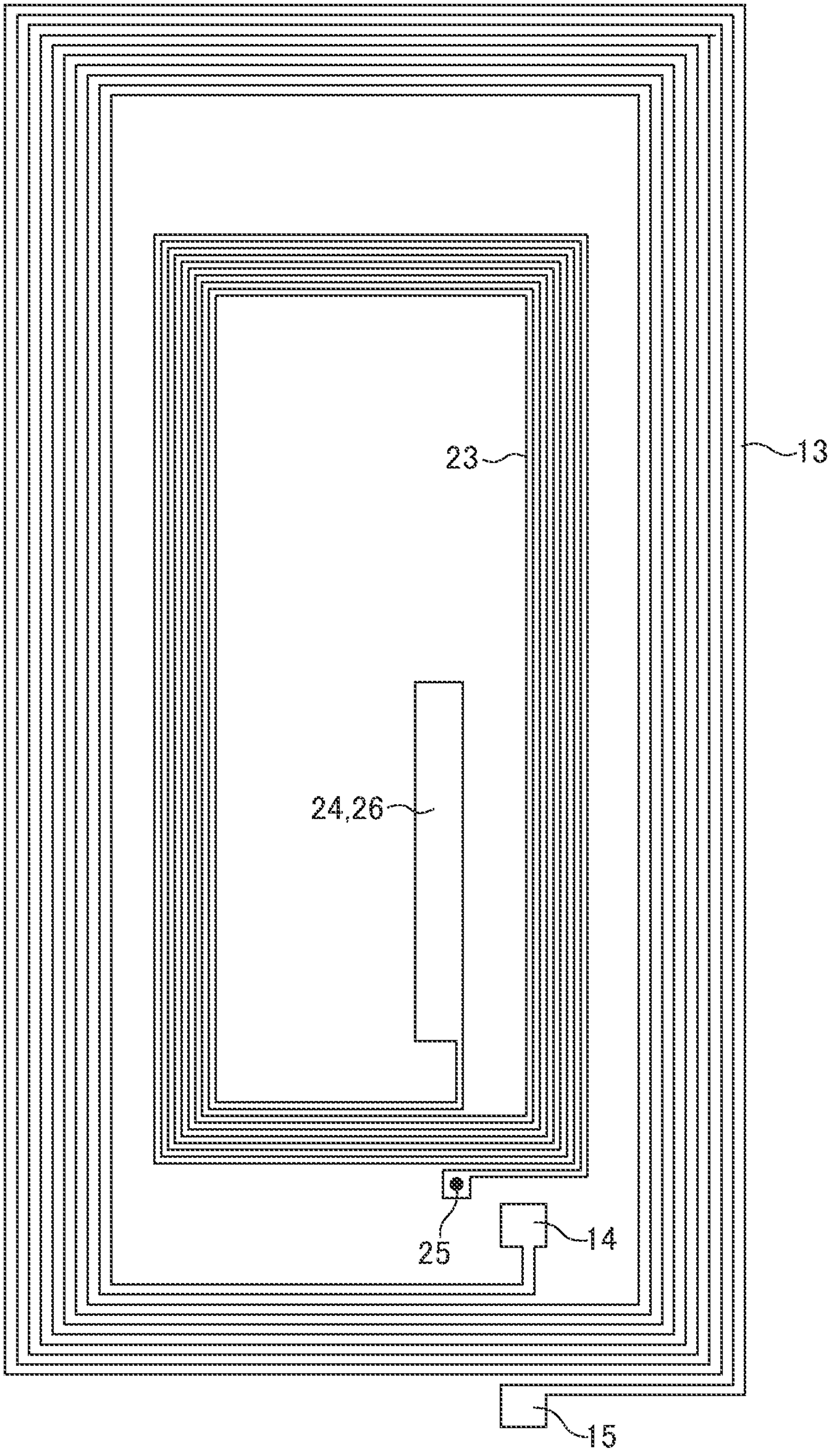
FIG. 4 is a schematic plan views for explaining a positional relationship between the antenna coil 13 and the booster coil 23.

The surface 21 of the thus configured magnetic sheet S with coil pattern is attached to the surface 12 of the substrate 10 through the adhesive layer 30. In this state, the antenna coil 13 and the magnetic sheet 27 overlap each other in a plan view and, as illustrated in FIG. 4, the opening area of the antenna coil 13 and the booster coil 23 overlap each other in a plan view. An inner peripheral end 14 and an outer peripheral end 15 of the antenna coil are connected to a not-shown NFC circuit. The NFC circuit may be mounted on the substrate 10 itself or on another substrate.

As described above, the antenna module 1 according to the present embodiment has, as separate members, the substrate 10 on which the antenna coil 13 is formed and the base material 20 on which the booster coil 23 is formed, thus allowing the booster coil 23 to be designed and manufactured independently of the antenna coil 13. This allows the design of the booster coil 23 to be changed after manufacturing the antenna coil 13. In addition, the magnetic sheet S with coil pattern has flexibility as a whole, so that even when unevenness is present on the surface 12 of the substrate 10, the magnetic sheet S with coil pattern can be tightly attached to the substrate 10.

Figure 5:
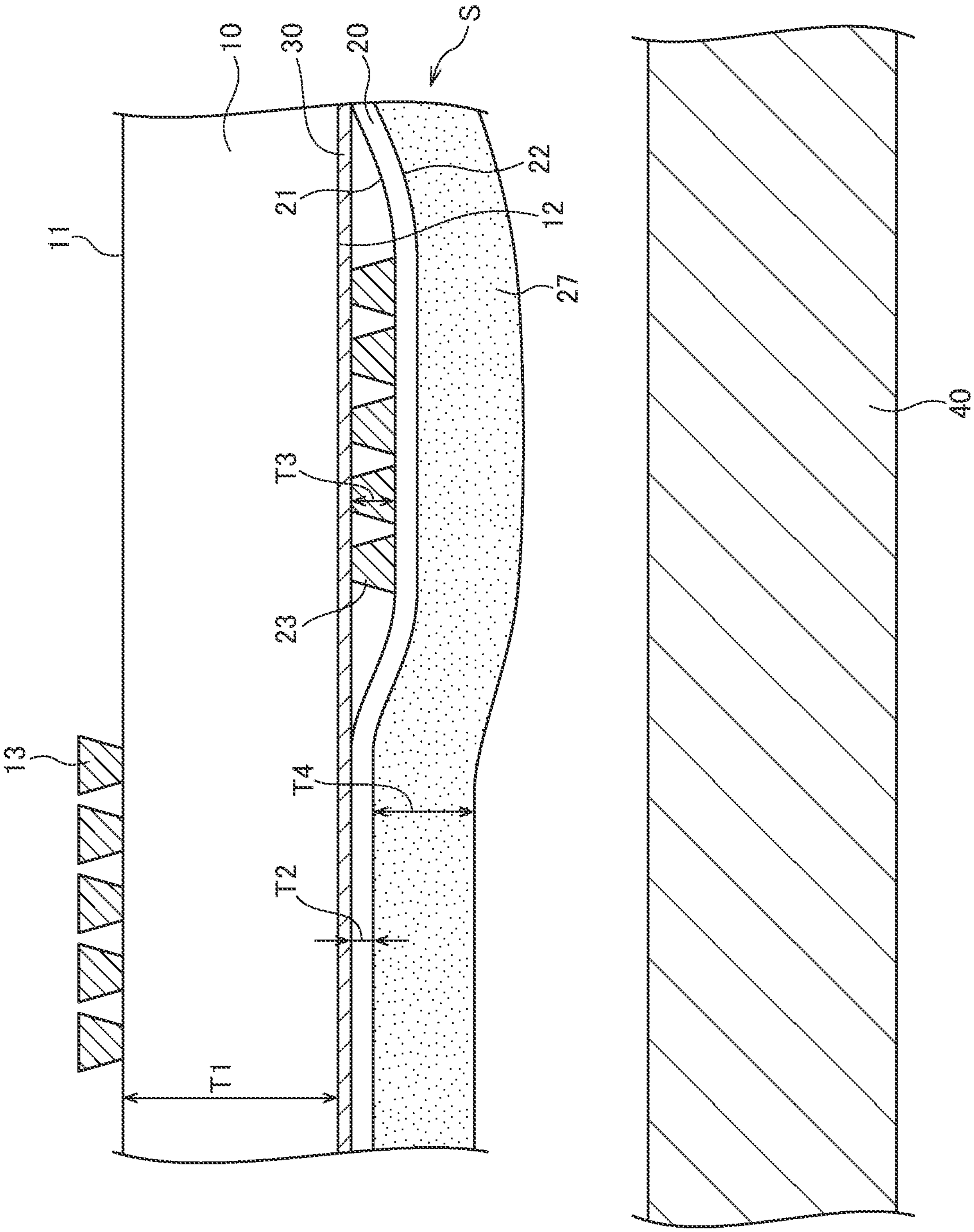
FIG. 5 is a partial cross-sectional view of the antenna module 1.

FIG. 5 is a partial cross-sectional view of the antenna module 1 according to the present embodiment.

As illustrated in FIG. 5, when the magnetic sheet S with coil pattern is attached to the substrate 10, the base material 20 and magnetic sheet 27 are deformed due to flexibility thereof at a region where the booster coil 23 is formed. That is, the surface 21 of the base material is in direct contact with the adhesive layer 30 at a region where the booster coil 23 is not formed, whereas the booster coil 23 is interposed between the base material 20 and the adhesive layer 30 at the region where the booster coil 23 is formed. Accordingly, the distance between the magnetic sheet 27 and the surface 12 of the substrate 10 is smaller at the region absent of the booster coil 23 than at the formation region of the booster coil 23. As a result, the distance between the antenna coil 13 and the magnetic sheet 27 becomes small, making it possible to extend communication distance.

Further, in the present embodiment, a thickness T2 (e.g., about 23 μm) of the base material 20 is smaller than a thickness T1 (e.g., about 0.8 mm) of the substrate 10. Accordingly, the distance between the booster coil 23 and the antenna coil 13 is larger than the distance between the booster coil 23 and the magnetic sheet 27, so that it is possible to reduce influence that a metal member 40 such as a battery disposed to face the magnetic sheet 27 has on the antenna coil 13. In addition, the thickness T2 of the base material 20 is smaller than a thickness T3 of the booster coil 23, whereby the booster coil 23 is partly radially covered with the magnetic sheet 27. This can further enhance the communication distance extension effect by the booster coil 23. The thickness T3 of the booster coil 23 is, for example, about 35 μm. A thickness T4 of the magnetic sheet 27 needs to be set to a value that can provide sufficient magnetic characteristics and flexibility and is, for example, about 100 μm. By thus making the thickness T2 of the base material 20 smaller than the thickness T3 of the booster coil 23 and the thickness T4 of the magnetic sheet 27, sufficient flexibility can be ensured.

Further, the antenna coil 13 formed on the surface 11 of the substrate 10 has a sectional shape in which the pattern width thereof becomes larger with increasing distance from the surface 11 of the substrate 10; on the other hand, the booster coil 23 formed on the surface 21 of the base material 20 has a sectional shape in which the pattern width thereof becomes smaller with increasing distance from the surface 21 of the base material 20. This reduces a stray capacitance occurring between the antenna coil 13 and the booster coil 23, making it possible to reduce a change in characteristics ascribable to the stray capacitance.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples, but not limited thereto.

An antenna module according to an embodiment of the present disclosure includes: a substrate on which a first coil is provided; a base material on which a second coil and a magnetic sheet overlapping the second coil are provided; and an adhesive layer bonding the substrate and base material such that the first coil and the magnetic sheet overlap each other. This allows the design of the second coil to be changed afterward.

Each of the base material and the magnetic sheet may have flexibility. This allows the base material to be tightly attached to the substrate even when the substrate has surface unevenness.

The first coil may be provided on a first surface of the substrate, the second coil may be provided on a first surface of the base material, the magnetic sheet may be provided on a second surface of the base material, the adhesive layer may bond a second surface of the substrate and the first surface of the base material, and the distance between the magnetic sheet and the second surface of the substrate may be smaller at a region where the second coil is not provided than at a region where the second coil is provided. This can reduce the distance between the first coil and the magnetic sheet.

The base material may be thinner than the substrate, whereby the distance between the second coil and the first coil may be larger than the distance between the second coil and the magnetic sheet. This can reduce the influence of a metal member disposed so as to face the magnetic sheet.

The base material may be thinner than the second coil, and the second coil may be partly radially covered with the magnetic sheet. This can further enhance a communication distance extension effect by the second coil.

The antenna module may further include a pair of capacitor electrode patterns provided respectively on the first and second surfaces of the base material so as to face each other through the base material, and the inner and outer peripheral ends of the second coil may be connected respectively to the pair of capacitor electrode patterns. This allows the adjustment of a resonance frequency without using a chip capacitor or the like.

The first coil may have a sectional shape in which the pattern width thereof becomes larger with increasing distance from the first surface of the substrate, and the second coil may have a sectional shape in which the pattern width thereof becomes smaller with increasing distance from the first surface of the base material. This can reduce a change in characteristics ascribable to a stray capacitance.

A magnetic sheet with a coil pattern according to an embodiment of the present disclosure includes: a flexible base material; a coil pattern provided on any surface of the base material and constituting a closed circuit; and a flexible magnetic sheet provided on any surface of the base material so as to overlap the coil pattern, wherein the base material is thinner than the magnetic sheet and the conductor thickness of the coil pattern. Attaching the thus configured magnetic sheet with coil pattern to a substrate having an antenna coil allows communication distance to be extended.

What is claimed is:

1. An antenna module comprising:
a substrate on which a first coil is provided;
a base material on which a second coil and a magnetic sheet overlapping the second coil are provided; and
an adhesive layer bonding the substrate and the base material such that the first coil and the magnetic sheet overlap each other,
wherein each of the base material and the magnetic sheet has flexibility,
wherein the first coil is provided on a first surface of the substrate,
wherein the second coil is provided on a first surface of the base material,
wherein the magnetic sheet is provided on a second surface of the base material,
wherein the adhesive layer bonds a second surface of the substrate and the first surface of the base material, and
wherein a distance between the magnetic sheet and the second surface of the substrate is smaller at a region where the second coil is not provided than at a region where the second coil is provided.

2. The antenna module as claimed in claim 1,
wherein the base material is thinner than the substrate, whereby a distance between the second coil and the first coil is larger than a distance between the second coil and the magnetic sheet.

3. The antenna module as claimed in claim 2,
wherein the base material is thinner than the second coil, and
wherein the second coil is partly radially covered with the magnetic sheet.

4. The antenna module as claimed in claim 1, further comprising a pair of capacitor electrode patterns provided respectively on the first and second surfaces of the base material so as to face each other through the base material,
wherein inner and outer peripheral ends of the second coil are connected respectively to the pair of capacitor electrode patterns.

5. The antenna module as claimed in claim 1,
wherein the first coil has a sectional shape in which a pattern width thereof becomes larger with increasing distance from the first surface of the substrate, and
wherein the second coil has a sectional shape in which a pattern width thereof becomes smaller with increasing distance from the first surface of the base material.

6. An apparatus comprising:
a flexible base material;
a coil pattern provided on any surface of the base material and constituting a closed circuit; and
a flexible magnetic sheet provided on any surface of the base material so as to overlap the coil pattern entirely,
wherein the base material is thinner than the magnetic sheet and a conductor thickness of the coil pattern and
wherein the coil pattern has a sectional shape in which a pattern width thereof becomes smaller with increasing distance from the surface of the base material.

7. The apparatus as claimed in claim 6, further comprising:
a first capacitor electrode pattern connected to a first end of the coil pattern; and
a second capacitor electrode pattern connected to a second end of the coil pattern.

8. The apparatus as claimed in claim 7,
wherein the base material has a first surface and a second surface opposite to the first surface,
wherein the first capacitor electrode pattern is provided on the first surface of the base material, and
wherein the second capacitor electrode pattern is provided on the second surface of the base material.

9. The apparatus as claimed in claim 8, wherein the first and second capacitor electrode patterns are surrounded by the coil pattern in a plan view.

10. The apparatus as claimed in claim 9, wherein the second capacitor electrode pattern is embedded in the magnetic sheet.

11. The apparatus as claimed in claim 10, further comprising an insulating film provided between the second capacitor electrode pattern and the magnetic sheet.

12. An apparatus comprising:
a flexible base material having a first surface and a second surface opposite to the first surface;
a coil pattern provided on the first surface of the base material, the coil pattern having a first end and a second end;
a first capacitor electrode pattern provided on the first surface of the base material and connected to the first end of the coil pattern;
a second capacitor electrode pattern provided on the second surface of the base material and connected to the second end of the coil pattern; and
a flexible magnetic sheet provided on the second surface of the base material so as to overlap the coil pattern, the first capacitor electrode pattern, and the second capacitor electrode pattern.

13. The apparatus as claimed in claim 12, wherein the second capacitor electrode pattern is embedded in the magnetic sheet.

14. The apparatus as claimed in claim 13, further comprising an insulating film provided between the second capacitor electrode pattern and the magnetic sheet.

15. The apparatus as claimed in claim 12, wherein the base material is thinner than the magnetic sheet and a conductor thickness of the coil pattern.

16. The apparatus as claimed in claim 12, wherein the coil pattern has a sectional shape in which a pattern width thereof becomes smaller with increasing distance from the first surface of the base material.

* * * * *